US006499039B1

(12) United States Patent
Venkatesh et al.

(10) Patent No.: US 6,499,039 B1
(45) Date of Patent: Dec. 24, 2002

(54) REORGANIZATION OF STRIPED DATA DURING FILE SYSTEM EXPANSION IN A DATA STORAGE SYSTEM

(75) Inventors: Dinesh Venkatesh, North Andover, MA (US); Wayne W. Duso, Shrewsbury, MA (US); John Forecast, Newton, MA (US); Uday Gupta, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/404,016

(22) Filed: Sep. 23, 1999

(51) Int. Cl.[7] ............................................ G06F 12/00
(52) U.S. Cl. ...................... 707/204; 707/200; 707/201; 707/202; 707/203; 707/205
(58) Field of Search ................................ 707/200–205; 711/114

(56) References Cited

U.S. PATENT DOCUMENTS

| 5,537,585 | A | * | 7/1996 | Blickenstaff et al. | ........ 707/204 |
| 5,719,983 | A | * | 2/1998 | Henderson et al. | ........... 386/70 |
| 5,764,972 | A | * | 6/1998 | Crouse et al. | .............. 707/204 |
| 5,812,753 | A | | 9/1998 | Chiariotti | |
| 5,860,137 | A | | 1/1999 | Raz et al. | ................... 711/202 |
| 5,892,915 | A | | 4/1999 | Duso et al. | |
| 5,974,424 | A | * | 10/1999 | Schmuck et al. | ........... 707/201 |
| 5,974,503 | A | * | 10/1999 | Venkatesh et al. | .......... 711/114 |
| 5,991,793 | A | | 11/1999 | Mukaida et al. | ............. 709/104 |
| 6,185,574 | B1 | * | 2/2001 | Howard et al. | ............. 707/200 |
| 6,269,382 | B1 | * | 7/2001 | Cabrera et al. | ............. 707/204 |
| 6,289,415 | B1 | * | 9/2001 | Johnson | ....................... 711/111 |

FOREIGN PATENT DOCUMENTS

EP  0 697 660 A1  2/1996  ........... G06F/11/20

OTHER PUBLICATIONS

Uresh Vahalia, *Unix Internals: The New Frontiers*, chapter 5, "File System Implementations," Prentice–Hall, Inc., Upper Saddle River, New Jersey, 1996, pp. 261–289.

David P. Anderson, Yoshitomo Osawa, and Ramesh Govindan, "A File System for Continous Media," *ACM Transactions on Computer Systems*, vol. 10, No. 4, Nov. 1992, pp. 311–337.

P. Venkat Rangan and Harrick M. Vin, "Designing File Systems for Digital Video and Audio," *Association for Computing Machinery*, 1991, pp. 81–94.

Randy H. Katz, Garth A. Gibson, and David A. Patterson, "Disk System Architectures for High Performance Computing," *Computer Science Division (EECS) Univ. of California Berkeley*, Report No. UCB/CSD 89/497, Mar. 1989, pp. 1–39.

(List continued on next page.)

*Primary Examiner*—Kim Vu
*Assistant Examiner*—Cam Y T Truong
(74) *Attorney, Agent, or Firm*—Howrey Simon Arnold & White

(57) ABSTRACT

To reorganize a striped file system, data blocks are sequentially moved from storage locations in original data storage to storage locations in an array including the original data storage and additional data storage. If the new striping has the same precedence order as the original striping, then temporary storage is not needed for the block movement. Otherwise, stripes of the data blocks are sequentially moved to a stripe of temporary storage locations, and moved from the stripe of the temporary locations to storage locations in the array. Once a pivot point is reached, however, there is no need to use the temporary storage. Moreover, there is an increasing separation between the read and write pointers. Once this separation exceeds the stripe length, the file system metadata can be synchronized at decreasing intervals and still permit concurrent read access. The number of block transfers between the synchronization points can increase exponentially, and the synchronization points can be aligned with extent boundaries.

22 Claims, 10 Drawing Sheets

OTHER PUBLICATIONS

David A. Patterson, Peter Chen, Garth Gibson, and Randy H. Katz, "Introduction to Redundant Arrays of Inexpensive Disks (RAID)," Compcon 89 Feb. 27–Mar. 31, 1989, IEEE, New York, N.Y., pp. 112–117.

David A. Patterson, Garth Gibson, and Randy H. Katz, "A Case for Redundant Arrays of Inexpensive Disks (RAID)," *Computer Science Division (EECS) Univ. of California Berkeley*, Report No. UCB/CSD 87/391, Dec. 1987, pp. 1–24.

"Filesystem *Manager—VxFS*" *http://www.fujitsu–computers.com/Servers/software/ds–mgw–12.html*, published at least as early as Oct. 28, 2000, 2 pages.

"VERITAS vol. Manager" *http://www.sun.com/stor . . . /volumemgr.html;$sessionid $QEOQTDQAAC2QHAMTA1FU5Y*, published at least as early as Oct. 28, 2000, 3 pages.

"VERITAS NetBackup and Storage Migrator" *http://www-.sun.com/stora  .  .  .  /netbackup.html; $sessionid$QEOQTDQAAC2QHAMTA1FU5Y*, published at least as early as Oct. 28, 2000, 5 pages.

"VERITAS File System, System Administrator's Guide," Release 3.2, VERITAS Software Corporation, Introduction, Index, Performance and Tuning (Chapter 5), fsadm_vxfs(1M)—resize or reorganize a VERITAS File System (*http://uw7doc.sco.com/ODM_FSadmin/fssag–1.html, fssag–13.html, fssag–8.html*and *http://uw7doc.sco.com/cgi–bin/man/man?fsadm_vxfs+1M*) published at least as early as Oct. 28, 2000, 31 pages total.

* cited by examiner

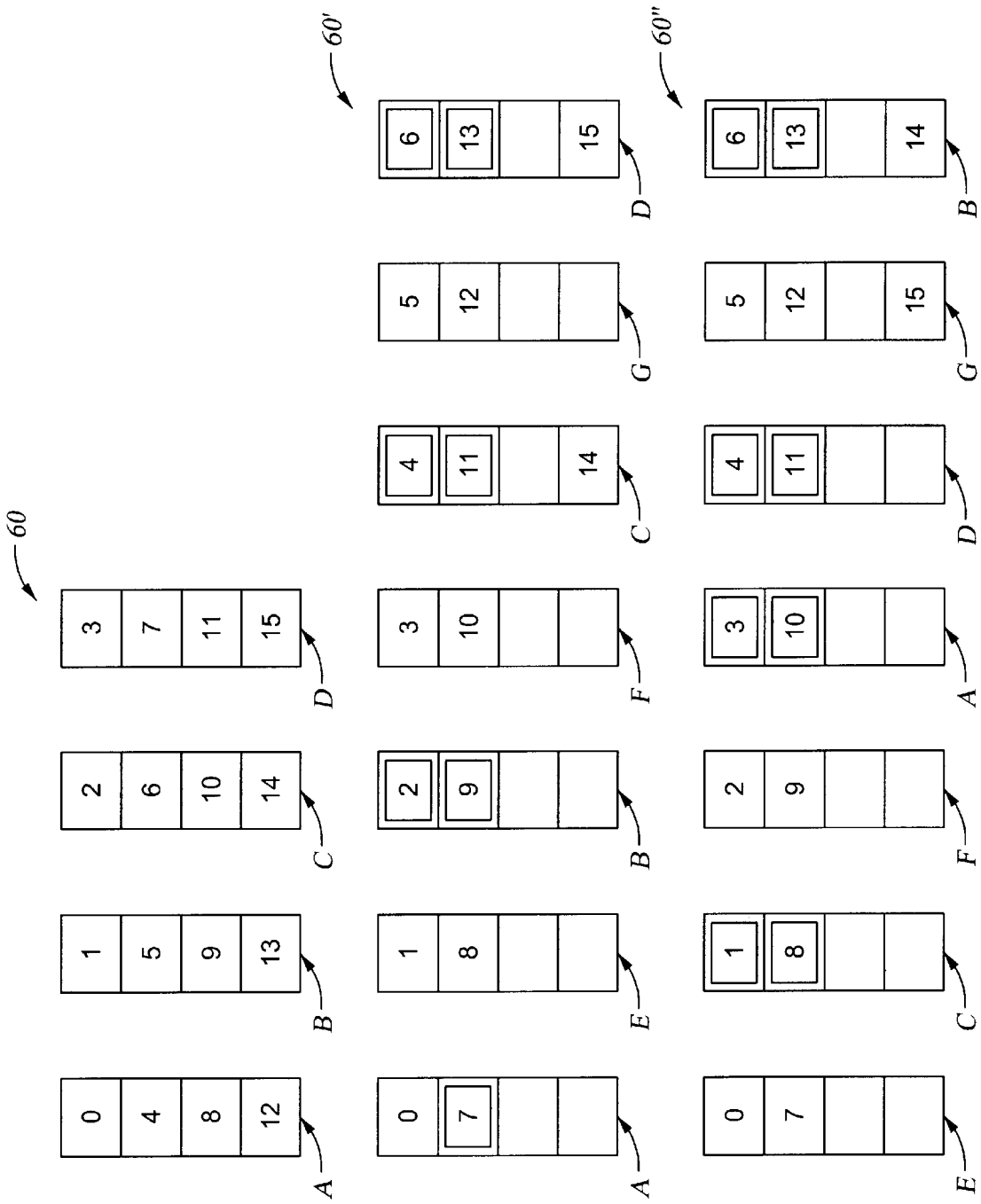

REORGANIZATION OF STRIPED DATA DURING FILE SYSTEM EXPANSION IN A DATA STORAGE SYSTEM

BACKGROUND OF THE INVENTION

1. Field of the Invention

The present invention relates generally to data storage systems, and more particularly to striping of data across a group of data storage devices in the data storage system.

2. Description of the Related Art

For superior performance and load balancing, it is known to stripe data for a data set across a group of data storage devices such as disk drives. Such striping permits access to the data set at a high, sustained throughput by simultaneously accessing multiple disk drives. This is particularly desirable for streaming backup data and for isochronous access to continues media datasets for video-on-demand applications, for example, as described in Duso et al. U.S. Pat. No. 5,892,915, issued Apr. 6, 1999.

Data storage systems are often sold with a storage capacity less than the maximum capacity that can be installed. The customer can install additional storage adapters and storage devices on an as-needed basis until the maximum capacity is reached. Once the storage is added, the customer may expand existing file systems to permit storage of new files in the file systems in the newly added storage. File system implementations including UFS (the conventional Unix File System) and VxFS (a Video File System) allow offline expansion. VxFS describes the expansion of a file system while it is on-line, but this on-line expansion is feasible only when a single host accesses the file system. Moreover, neither UFS nor VxFS allows the expansion of striped file systems.

When storage is added to a system having a relatively small number of data storage devices, it is often possible to increase substantially the sustained throughput for access to a striped dataset by reorganizing the striped dataset so that it becomes striped across the newly added data storage devices as well as the initially installed data storage devices. Such a reorganization has been achieved by backing any existing data onto secondary storage (such as tape), rebuilding a new stripe volume, and restoring the content from the backup. However, in situations where a secondary backup system is not readily available, storage expansion must be facilitated by reorganizing content on the fly. The expansion scheme must also ensure that the original data is not corrupted during the reorganization.

SUMMARY OF THE INVENTION

The present invention provides a method of operating a data storage system for on-line expansion of a file system so that the file system uses additional data storage added to original data storage of the data storage system. The data of the file system resides in the original data storage prior to the expansion. The method includes reorganizing at least a portion of the data of the file system by moving some of the data of the file system from the original data storage to the additional data storage so that the data of the file system is distributed over the original data storage and the additional data storage. The method further includes repetitively updating metadata of the file system during the movement of data of the file system to permit a host processor to access concurrently the data of the file system during the reorganization of the file system.

In accordance with another aspect, the invention provides a method of reorganizing striped data initially striped over original storage devices. The data is reorganized by striping over an array of storage devices including the original storage devices and additional storage. An order of striping of the data over the original data storage prior to the reorganization is not preserved during the striping of the data across the array of storage devices. The method includes sequentially moving data from storage locations in the original storage devices to temporary storage, and from the temporary storage to storage locations in the array of storage devices, until a pivot point is reached. After the pivot point is reached, data is moved data sequentially from storage locations in the original storage devices to storage locations in the array of storage devices, without using temporary storage for the data that is moved.

In accordance with yet another aspect, the invention provides a method of reorganizing striped data initially striped over original storage devices. The data is reorganized by striping over arrays of storage devices including the original storage devices and additional storage. The method includes receiving specifications of orders of striping of data over arrays of storage devices. Upon receiving each specification of an order of striping of data over an array of storage devices, the specification is inspected to determine whether or not an order of striping of data over the original storage devices is preserved in the specified order of striping of data over the array of storage devices. When an order of striping of data over the original storage devices is preserved in the specified order of striping of data over the array of storage devices, a linear reorganization is performed by sequentially moving blocks of data from original storage locations in the original storage devices to new storage locations in the array data storage devices. When an order of striping of data over the original storage devices is not preserved in the specified order of striping of data over the array of storage devices, a random reorganization is performed by sequentially moving stripes of the blocks of data from original storage locations to a set of temporary storage locations, and from the set of temporary storage locations to storage locations in the array of storage devices.

In accordance with still another aspect, the invention provides a method of permitting a processor to access striped data of a file while the striped data is being reorganizing. The striped data of the file is initially striped over original storage devices. The data is reorganized by striping over an array of storage devices including the original storage devices and additional storage. The method includes reorganizing the striped data of the file by sequentially moving blocks of data from respective storage locations in the original storage devices to respective storage locations in the array of storage devices. There is an increasing offset between the storage location from which each block is read and the storage location from which said each block is written. The method further includes repetitively updating metadata of the file at a decreasing rate as the offset increases between the storage location from which said each block is read and the storage location from which said each block is written. Therefore, the processor concurrently accesses the striped data of the file by accessing the metatdata of the file to determine a current storage location of the file data to be accessed.

In accordance with still another aspect, the invention provides a data storage system. The data storage system includes original data storage containing a file system, and a data processor for accessing the file system in the data storage. The data processor is programmed for on-line expansion of the file system so that the file system may use additional data storage added to the original data storage. The data processor is programmed to perform the on-line expansion by moving some of the data of the file system from the original data storage to the additional data storage so that the data of the file system is distributed over the original data storage and the additional data storage, and repetitively updating metadata of the file system during the movement of data of the file system to permit a host processor to access concurrently the data of the file system during the reorganization of the file system.

In accordance with a final aspect, the invention provides a program storage device containing a program for a data processor of a data storage system. The program is executable by the data processor for on-line expansion of a file system so that the file system may use additional data storage added to original data storage. The program is executable by the data processor to perform the on-line expansion by moving some of the data of the file system from the original data storage to the additional data storage so that the data of the file system is distributed over the original data storage and the additional data storage, and repetitively updating metadata of the file system during the movement of data of the file system to permit a host processor to access concurrently the data of the file system during the reorganization of the file system.

BRIEF DESCRIPTION OF THE DRAWINGS

Other objects and advantages of the invention will become apparent upon reading the following detailed description with reference to the accompanying drawings wherein:

FIG. 4 is a block diagram of an initial configuration of data blocks stored in an array of disk drive sets;

FIG. 5 is a block diagram of a new storage configuration after the addition of new disk drive sets to the array of FIG. 4 and a linear reorganization of the data blocks;

FIG. 6 is a block diagram of a new storage configuration after addition of new disk drive sets to the array of FIG. 4 and a random reorganization of the data blocks;

Figure 1:
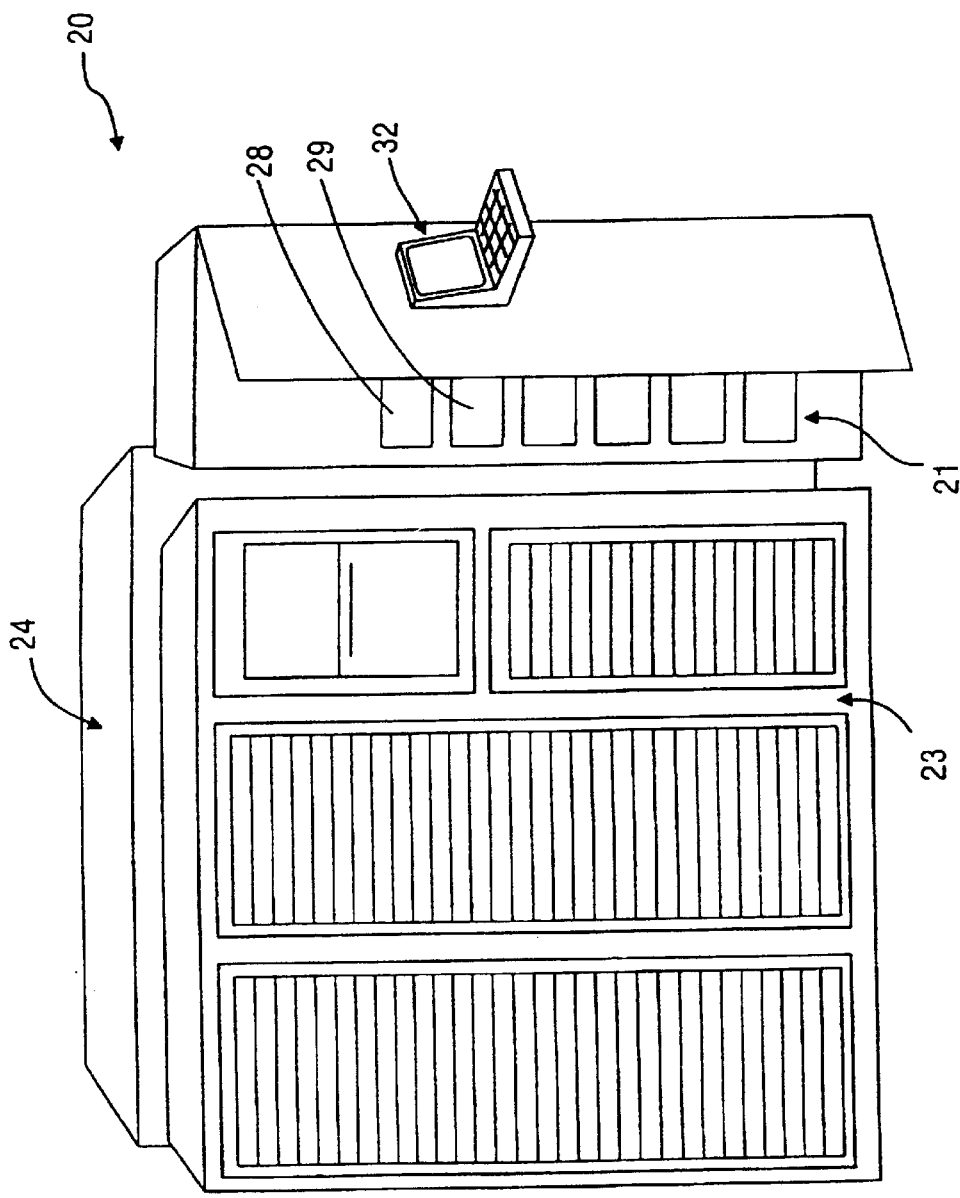
FIG. 1 is a perspective view of a video file server that incorporates the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DESCRIPTION OF THE PREFERRED EMBODIMENTS

With reference to FIG. 1 of the drawings, there is shown a video file server generally designated 20 incorporating the present invention. Although the invention is generally applicable to a data storage system employing an array of data storage devices, it is particularly useful in such a video file server 20 to provide high continuous data throughput for network backup and video-on-demand services. The video file server 20 includes an array of stream servers 21, at least one control server 28, 29, a cached disk array storage subsystem 23, and an optional tape silo 24. The video file server 20 is a high performance, high capacity, and high-availability network-attached data server. It provides the ability for multiple file systems to exist concurrently over multiple communication stacks, with shared data access. It also allows multiple physical file systems to co-exist, each optimized to the needs of a particular data service.

The video file server 20 is managed as a dedicated network appliance, integrated with popular network operating systems in a way, which, other than its superior performance, is transparent to the end user. It provides specialized support for isochronous data streams used in live, as well as store-and-forward, audio-visual applications. Therefore, the video file server 20 is suitable for a wide variety of applications such as image repositories, video on demand, and networked video applications, in addition to high-end file server applications such as the Network File System (NFS, version 2 and version 3) (and/or other access protocols), network or on-line backup, fast download, etc. NFS is a well-known IETF file access protocol standard (RFC 1094, Sun Microsystems, Inc., "NFS: Network File System Protocol Specification," Mar. 1, 1989). NFS acts as a network server for network communications by providing basic file access operations for network clients. Such basic file access operations include opening a file, reading a file, writing to a file, and closing a file.

The clustering of the stream servers 21 as a front end to the cached disk array 23 provides parallelism and scalability. The clustering of random-access memory in the stream servers 21 provides a large capacity cache memory for video applications.

Each of the stream servers 21 is a high-end commodity computer, providing the highest performance appropriate for a stream server at the lowest cost. The stream servers 21 are mounted in a standard 19" wide rack. Each of the stream servers 21, for example, includes and Intel processor connected to an EISA or PCI bus and at least 64 MB of random-access memory. The number of the stream servers 21, their processor class (i486, Pentium, etc.) and the amount of random-access memory in each of the stream servers, are selected for desired performance and capacity characteristics, such as the number of concurrent users to be serviced, the number of independent multi-media programs to be accessed concurrently, and the desired latency of access to the multi-media programs, as will be further described below.

Each of the stream servers 21 contains one or more high-performance FWD (fast, wide, differential) SCSI connections to the back-end storage array. Each of the stream servers 21 may also contain one or more SCSI connections to the optional tape silo 24. Each of the stream servers 21 also contains one or more outbound network attachments configured on the stream server's EISA or PCI bus. The outbound network attachments, for example, are Ethernet, FDDI, ATM, DS1, DS3, or channelized T3 attachments to data links to a network (25 in FIG. 2). Each of the stream servers 21 also includes an additional Ethernet connection to a dual redundant internal Ethernet link (26 in FIG. 2) for coordination of the stream servers with each other and with one or more controller servers 28, 29.

Figure 2:
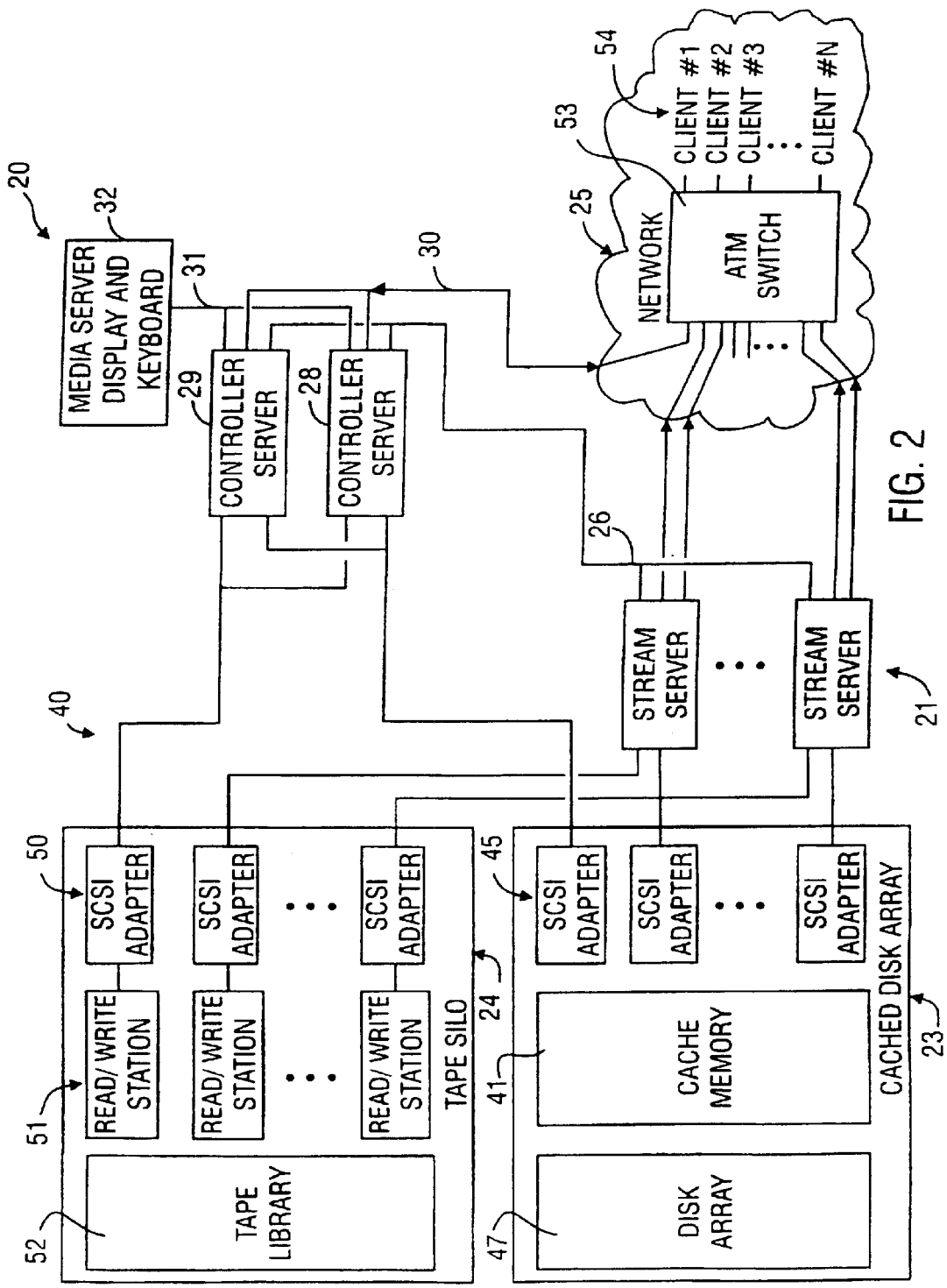
FIG. 2 is a block diagram of the video file server of FIG. 1 and its connections to a network.

The controller servers 28, 29 shown in FIG. 2 are dual redundant computers 28, 29, each of which is similar to each of the stream servers 21. Each of the dual redundant controller servers 28, 29 has a network attachment to a bi-directional link (30 in FIG. 2) in the network (25 in FIG. 2), through which each of the controller servers 28, 29 can conduct service protocols. The service protocols include one or more standard management and control protocols such as SNMP (RFC 1157, M. Schoffstall, M. Fedor, J. Davin, J. Case, "A Simple Network Management Protocol (SNMP)," May 10, 1990), and at least one Continuous Media File Access Protocol supporting isochronous real-time multimedia data transmission from the stream servers 21 to the network (25 in FIG. 2).

Each of the dual redundant controller servers 28, 29 has an Ethernet connection to the local Ethernet link 26. Each of the controller servers 28, 29 also has a connection to a serial link 31 to a media server display and keyboard 32. The controller servers 28, 29 run a conventional operating system (such as Windows NT or UNIX) to provide a hot-failover redundant configuration. An active one of the dual redundant controller servers 28, 29 functions as a media server controller for the video file server 20. The active one of the controller servers 28, 29 also allows management and control of the server resources from the network using standard protocols, such as the Simple Network Management Protocol (SNMP). SNMP is an internet protocol that permits inspection and modification of system variables such as the network address (IP) and the number of buffers for network communication. The active one of the controller servers 28, 29 may also provide lock management if lock management is not provided by the cached disk array 23.

For multi-media data transfer, the active one of the controller servers 28, 29 assigns one of the stream servers 21 to the network client 54 requesting multi-media service. The network 25, for example, has conventional switching mechanisms, such as an ATM switch 53 or arrays of cross-bar switches, that permit any one of the clients 54 to communicate with any one of the stream servers 21. The active one of the controller servers 28, 29 could assign a stream server to a network client by a protocol sending to the client the network address of the stream server assigned to send or receive data to or from the client. Alternatively, the active one of the controller servers 28, 29 could communicate with a switching mechanism such as the ATM switch 53 to establish a data link between the client and the stream server assigned to the client.

The cached disk array 23 is configured for an open systems network environment. Preferably the cached disk array 23 is a Symmetrix 5500 (Trademark) cached disk array manufactured by EMC Corporation, 171 South Street, Hopkinton, Mass., 01748-9103.

With reference to FIG. 2, there is shown a block diagram of the video file server 20 including the SCSI connections 40 among the cached disk array 23, the optional ape silo 24, the controller servers 28, 29, and the stream servers 21. The cached disk array 23 includes a large capacity semiconductor cache memory 41 and SCSI adapters 45 providing one or more FWD SCSI links to each of the stream servers 21 and to each of the dual redundant controller servers 28, 29.

The tape silo 24 includes an array of SCSI adapters 50 and an array of read/write stations 51. Each of the read/write stations 51 is connected via a respective one of the SCSI adapters 50 and a FWD SCSI link to a respective one of the stream servers 21 or each of the redundant controller servers 28, 29. The read/write stations 51 are controlled robotically in response to commands from the active one of the controller servers 28, 29 for tape transport functions, and preferably also for mounting and unmounting of tape cartridges into the read/write stations from storage bins.

In a preferred mode of operation, to archive data from a file from the network to tape, one of the stream servers 21 receives the file from the network 25 and prestages the file to the cached disk array 23 at a high rate limited by the network transmission rate (about 150 GB/hour). Then one of the stream servers 21 destages the file from the cached disk array 23 to an associated one of the read/write stations 51 at a tape device speed (about 7 GB/hour). For most applications, prestaging to disk can be done immediately, and staging from disk to tape including sorting of files onto respective tape cassettes can be done as a background operation or at night, when the load on the video server is at a minimum. In this fashion, the cached disk array 23 can absorb a high data inflow aggregation from tens or hundreds of network links streaming from multiple sites, and balance this load on the read/write stations 41. Prestaging to the cached disk array allows better use of the read/write stations 51, matching of server flow to tape streaming flow, and reduction of tape and read/write station wear. Prestaging to the back-end also allows multiple classes of backup and restore services, including instant backup for files maintained on disk in the cached disk array, and temporary batch backup pending a success or failure acknowledgment. Prestaging to the cached disk array 23 also makes economical an on-line archive service performing the staging from the cached disk array to tape as a background process.

Figure 3:
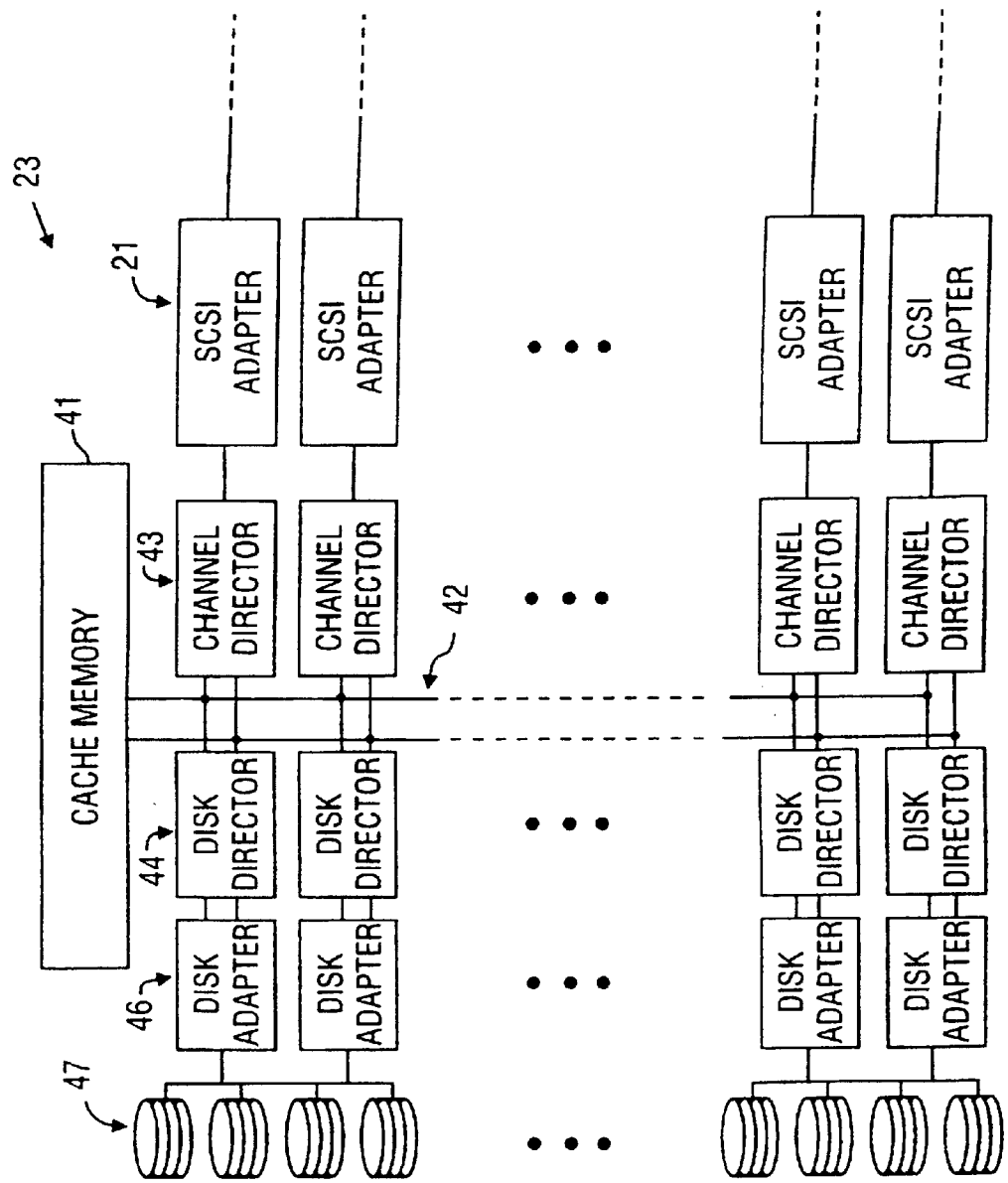
FIG. 3 is a block diagram of a cached disk array storage system used in the video file server of FIG. 1.

With reference to FIG. 3, there is shown a more detailed block diagram of the cached disk array 23. The cache memory 41 is composed of dynamic RAM cards mating with a dual redundant back-plane system bus 42. The cached disk array 23 also includes micro-processor cards that mate with the back-plane system bus 42 and are programmed to function as channel directors 43 or disk directors 44. Each of the channel directors 43 is interfaced through one of a number of SCSI adapters 45 to the SCSI interface of one of the stream servers 21. Each of the disk directors 44 is interfaced through at least one of a number of disk adapters 46 connected to a string of commodity FBA (fixed-block architecture) disk drives 47. The channel directors 43 access data in the cache memory 41 in response to a request from its associated stream server. If data to be read by a channel director are not found in cache memory, one of the disk directors 44 and disk adapters 46 transfers or "stages" the data from the disk array 47 to the cache memory 41. In a background process, the disk directors 44 and disk adapters 45 also write-back data from the cache memory 41 to the disk array 47, after the channel directors write data to the cache memory 41. In addition to providing intermediate storage for the data transferred between the channel directors 43 and the disk directors 44, the cache memory 41 also provides intermediate storage for control information transferred among the channel directors and disk directors.

The bus 42 is preferably the back-plane of a printed-circuit card-cage or main-frame in the cached disk array 23, and each of the channel directors 43 and disk directors 44 is constructed on a printed circuit board that is mounted in the card-cage or main-frame. The channel director and disk director boards are further described in Yanai et al. U.S. Pat. No. 5,335,352, issued Aug. 2, 1994, and entitled Reconfigurable, Multi-Function Disc Controller, incorporated herein by reference. The cache memory 13 is constructed on a number of additional printed circuit boards that are mounted in the card-cage or main-frame. Further details regarding the construction and operation of the cached disk array 23 are disclosed in Yanai et al., U.S. Pat. No. 5,206,939, issued Apr. 27, 1993; and Yanai et al. U.S. Pat. No. 5,381,539, issued Jan. 10, 1995; all incorporated herein by reference.

With reference to FIG. 4, there is shown the striping of continuous data in a logical volume 60 consisting of data in disk drive sets A, B, C, and D. Each disk drive set includes at least one disk drive, and it may include more than one disk drive to provide a redundancy group for protection against failure of a single disk drive in the redundancy group. For example, each disk drive set A, B, C, and D could consist of a mirrored pair of disk drives. Alternatively, each disk drive set A, B, C, and D could include four disk drives organized as a (3,4) RAID (Redundant Array of Inexpensive Disks) set, or each disk drive set could include eight disk drives organized as a (7,8) RAID set. A (7,8) RAID set, for example, is shown in FIG. 21 of U.S. Pat. No. 5,892,915. The designation (7,8) indicates that the RAID set includes eight disk drives, the data storage capacity is the storage capacity of seven disk drives, and the storage capacity of one disk drive is used to store parity information for the RAID set. The parity information is typically distributed among all the disk drives in the RAID set.

In FIG. 4, the data storage space of each disk drive set A, B, C, and D is subdivided into four portions, so that the data storage space of the logical volume 60 appears as a matrix of four rows and four columns. The rows represent hypervolumes of data, and the columns represent the disk drive sets. In practice, the number of hypervolumes in one logical volume may greatly exceed four, and the following description is applicable to any number of hypervolumes in a logical volume. For storing continuous media data, for example, each cell in the matrix could consist of the data returned from one disk drive set when each disk drive in the disk drive set reads one physical track. Therefore, the number of hypervolumes in the logical volume 60 would be the number of tracks in one disk drive, less an allowance for possible bad tracks in one disk drive.

Typically data of a file cannot reside in more than one logical volume. For example, in the Unix operating system, each file is associated with a root directory, which can correspond to a logical volume. The data structure including the root directory and any subdirectories and files associated with the root directory is called a file system. The file system also includes metadata about the directories and the files. The metadata includes directory and file attributes and mapping information. The mapping information provides at least one logical address for the data of each file in the file system. The logical address includes a logical track address in the logical volume. The logical tracks may or may not correspond to physical tracks in the disk drives.

Typically the data of each logical track is stored in a corresponding integral number of physical tracks. Each read/write request to the cached disk array specifies a logical address including a logical volume number and a logical track number. The cached disk array maps the logical volume number to a corresponding group of disk drives, and maps the logical track number to one or more physical tracks of one or more disk drives in the corresponding group of disk drives. Preferably, the mapping will stripe logical track addresses across the disk drive sets of each logical volume. For example, in FIG. 4, the cells of the matrix are data blocks 0, 1, 2, . . . , 14, 15 of the logical volume. Each data block has a corresponding logical track address of data at the beginning of the block. The logical track numbers, for example, are related in a linear fashion to the data block numbers. Therefore, the stripe of data corresponding to each hypervolume can be sequentially read from or written to the logical volume by repetitively issuing a read or write command to the cached disk array and incrementing the logical address. The striping of data in this fashion permits access to the hypervolumes at a high, sustained throughput by simultaneously accessing the multiple disk drives of the disk drive sets A, B, C, and D.

Data storage systems are often sold with a storage capacity less than the maximum capacity that can be installed. The customer can install additional storage adapters and storage devices on an as-needed basis until the maximum capacity is reached. When new storage is added, it is desirable to expand existing logical volumes. This will postpone any problem of migrating files from one file system to another when the file system of an existing logical volume becomes filled with data. Moreover, if an existing logical volume has a relatively small number of disk drives, it is possible to expand the logical volume and reorganize the physical storage of the data in the logical volume to achieve a substantial increase in data access throughput. In this case the physical storage of the data must be reorganized so that the data becomes striped across a greater number of storage devices such as disk drives.

Any file system expansion should preserve the data block ordering. In other words, block i on the new system contains the same data as block i on the old system. For example, data block ordering is preserved either by a linear expansion as shown in FIG. 5, or by a random expansion as shown in FIG. 6. If the data block ordering were not preserved, then the process of mapping the logical track numbers to the disk drives and physical tracks would be more complicated, and there could be a reduction in the sustainable data access throughput for sequential access of the logical tracks. For example, preservation of the data block ordering ensures that the relationship between the logical track number LT and the block number i is given by LT=LTPB*i, where LTPB is the number of logical tracks per block, and * is the multiplication operator. (Here and in the following description, mathematical operations are expressed in accordance with the conventional "C" programming language.)

In a linear expansion, each new disk drive set is inserted at any point in the ordering of original disk drive sets for the logical volume, but the relative positioning of each original disk drive set with respect to each other original disk drive set remains unchanged. This is illustrated in FIG. 5, where new disk drive sets E, F, and G are inserted at arbitrary points, but the precedence order for the original disk drive sets A, B, C, and D is preserved in the expanded logical volume 60'.

In a random expansion, the new disk drive sets can be inserted at any point, and the precedence order of the original disk drive sets is changed. This is illustrated in FIG. 6, where the new disk drive sets E, F, and G are inserted at arbitrary points, and the precedence order for the original disk drive sets A, B, C, and D has been changed to C, A, D, B in the expanded logical volume 60".

For either linear expansion or random expansion, reorganization requires reading a block from an original stripe and writing it to the proper location on the new stripe. Each block represented by a double line box in FIG. 5 or FIG. 6, for example, is stored on an original disk drive set in one or more physical tracks that are overwritten to preserve the block ordering requirements. Clearly, the original data cannot be corrupted during reorganization.

For a linear expansion, a single process that reads data linearly (linearly defined as one block at a time, in block number sequence, starting at block 0) from the original configuration and writes the data to the new configuration will reorganize the physical storage of the data for the logical volume without corrupting the original data. The proof is as follows. Consider the new stripe structure. Let $i_n$ and $i_o$ represent the block numbers of the first blocks of the new and old stripes respectively. Either $i_n$, $i_o$, or both are 0.

If $i_n < i_o$, a linear process would store $i_0$ blocks in their new locations before overwriting the old data on block $i_0$. Thus an old block is always stored in its new location before it is overwritten.

If $i_n > i_0$, a linear process overwrites the first $i_n$ blocks with the exact same data. After this point, the behavior of the process is similar to the scenario when $i_n < i_0$.

For example, in FIG. 5, first, block 0 on disk drive set A is written onto itself, then block 1 is copied from disk drive set B to E. When block 2 must be copied from disk drive set C to disk drive set B, data cannot be corrupted because block 2 has already been written over to its new location. Thus, a linear process is sufficient for a linear reorganization of the disk drive configuration for the logical volume.

Figure 7:
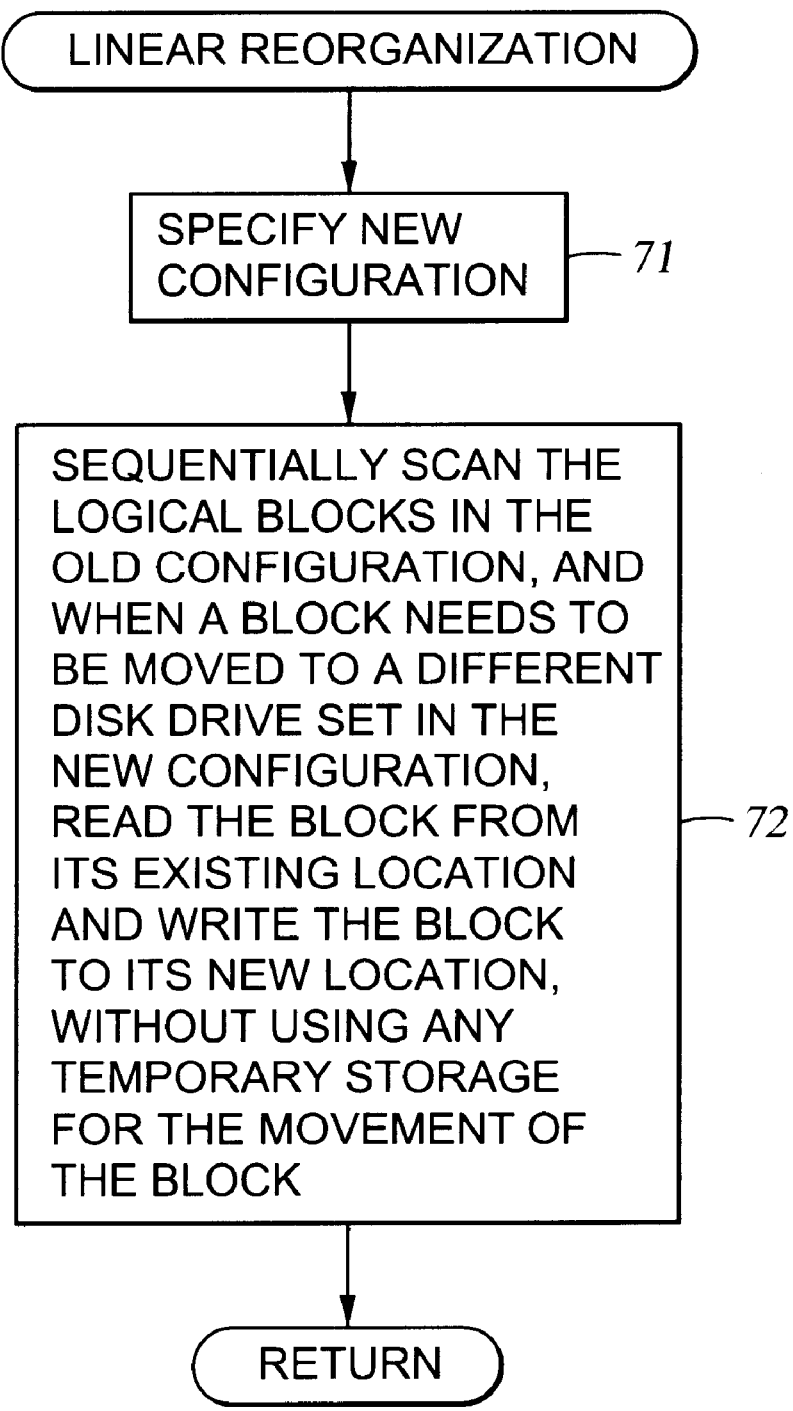
FIG. 7 is a flowchart of a procedure for a linear reorganization of data blocks in a disk array.

With reference to FIG. 7, a procedure for performing linear expansion may include two steps. Let B represent the number of blocks in the original stripe that must be reorganized. The first step 71 is to specify the new configuration of disk drive sets for the expanded logical volume. For example, the new configuration is specified by a reorganization vector V, where the number of elements of the vector V is the number N2 of disk drive sets in the new configuration, and each element of the vector V has a value of either one to indicate a position of an old disk drive set in the new configuration, or zero to indicate a position of a new disk drive set in the new configuration. For the configuration shown in FIG. 5, for example, N2 is 7 and the vector V is [1,0,1,0,1,0,1]. For the video file server of FIG. 1, for example, a system administrator enters the reorganization vector by using the media server display and keyboard 32.

The second step 72 is to sequentially scan the blocks of the logical volume to be expanded, and when a block needs to be located in a disk drive set in the new configuration that is different from the disk drive set where the block is located in the original configuration, the block is read from the disk drive set where it is located in the old configuration and written to the disk drive set where it is located in the new configuration, without any need for using temporary storage for the block. For example, this is done by executing the following C-language program:

```
/* The elements of the reorganization vector V are */
/* right-aligned bits in a word, and the first element */
/* of V is the least significant bit of the word. */
/* K is a word having a single bit set for scanning */
/* reorganization vector V. */
K=0x1;
i=0;
j=0;
while (i<B) {
   for(a=0; a<N2; a++) {
      if ((i !=j) && (K & V)) {
         read block[j];
         write block[I];
         i++;
         K<<;
      }
      j++;
   }
   K=0x1
}
```

In the C language, "0x1" is a hexadecimal value of one used to indicate the setting of a bit mask, "++" is an increment operator, "!=" is a not equal comparison, "&&" is a logical and, "&" is a bit-wise and, and << is a left shift by one bit position.

The linear expansion procedure cannot be used to expand the logical volume from the original disk drive configuration of FIG. 4 to the new disk drive configuration of FIG. 6. After block 0 has been copied from disk drive set A to disk drive set E, we cannot copy block 1 from B to C as block 1 has not yet been written to its new location. A linear expansion procedure would thus corrupt the data for this case of a random reorganization.

A known method of avoiding data corruption in the case of a random reorganization is to copy all of the original data to temporary storage and then write the original data from the temporary storage to the new configuration of the disk drive sets. Such a procedure, however, will most often use more temporary storage than is necessary and perform needless read and write operations. The temporary storage requirements and read-write loading can be reduced by a pivoting technique for random reorganization.

The pivoting technique can be understood from the observation that the upward movement of data during a sequential transfer of data blocks from the original disk drive sets to the new disk drive configuration results in an increasing distance between the old and new data positions. For example, consider the state of expansion in FIG. 6 after blocks 0 to 13 have been reorganized. The next block that must be read is block 14 on the old stripe, which corresponds to block 27 on the new stripe. The only block between blocks 13 and 27 that contains valid data is block 25, which maps to block 15 on the old stripe.

The expansion can be visualized as the original data "bubbling up," in a well-defined manner. In other words the read offset is always greater than the write offset and the distance between the two keeps increasing as the expansion proceeds. A pivot is defined as the read-offset following which there is a sufficient distance between the read and write offsets so that the expansion can proceed linearly, with the guarantee of no data corruption.

The value of the read-offset, I, following which an entire stripe segment between the old and new data positions that can be written over without affecting data integrity is created is given by I=N1*N2, where N1 is the number of disk drive sets in the original configuration, and as before N2 is the number of disk drive sets in the new configuration. In other words, after I blocks have been reordered, we can apply a linear expansion technique and guarantee the absence of any data corruption.

Figure 8:
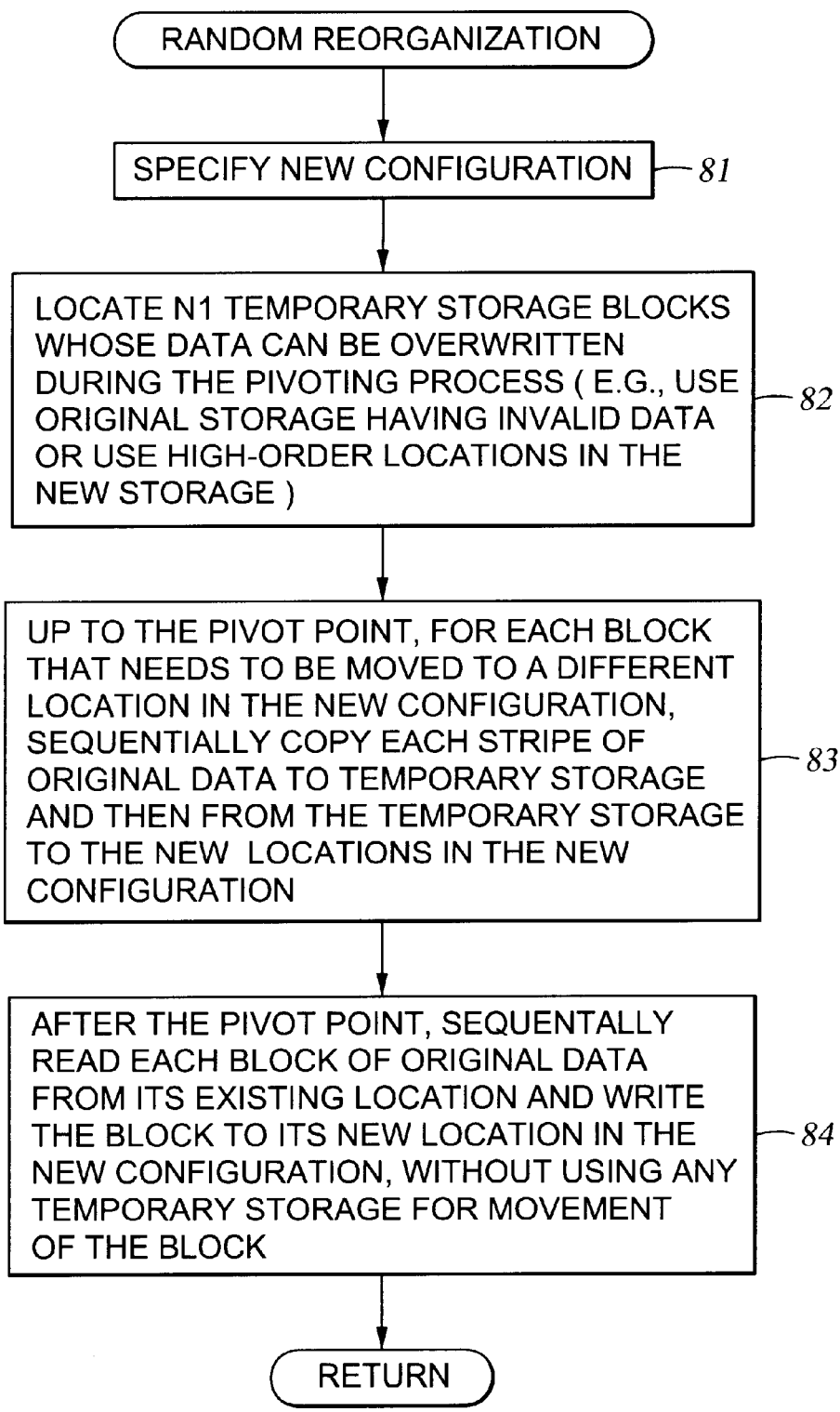
FIG. 8 is a flowchart of a procedure for a random reorganization of data blocks in a disk array.

With reference to FIG. 8, a procedure for using pivoting during random reorganization includes the following four steps. In a first step 81, the desired random reorganization is specified, for example in terms of an order vector O having N1 elements, where the $i_{th}$ element identifies the read-order for a stripe, in units of stripe depth, for the $i_{th}$ original disk drive set. For example, in FIG. 6, O=[3,6,4,1]. Such a vector could be used to specify any reorganization, linear or random. If and only if the elements of the order vector O form a monotonically increasing sequence, then the reorganization is linear.

In the second step 82, N1 temporary blocks T are located whose data can be overwritten without corruption during the pivoting process. For example, in FIG. 4, blocks 14 and 15 can be used as temporary blocks because they are blocks of the original data sets that do not contain valid data. The upper-most blocks of the newly added disk drive sets are also likely to be available for use as temporary blocks. For example, in the final configuration, there are NH*N2 data blocks but at most NH*N1 of the data blocks contain valid data, where NH is the number of hypervolumes in the logical volume. In the new configuration, the valid data will occupy no more than the first ((NH* N1/N2)+1) hypervolumes. Therefore, at least the uppermost (NH−((NH*N1/N2)+1))) blocks of each of the (N2−N1) new disk drive sets can be used as temporary blocks. For the final configuration in FIG. 6, for example, at least the uppermost block of each of the new disk drive sets E, F, and G are available as temporary blocks. Therefore, we can select T=[24,25,26,27], were the elements of the vector T are block numbers of the block storage locations in the new configuration.

In a third step 83, up to the pivot point, for each block of data in the original configuration that needs to be moved to a different storage location in the new configuration, each stripe of original data is sequentially copied to the temporary storage, and is then copied from the temporary storage to the new locations for the stripe in the new configuration. Finally in a fourth step 84, after the pivot point, each block of original data is sequentially read from its existing location in the original configuration, and written to its new location in the new configuration, without using any temporary storage for the movement of the block. An example of a program for performing the third and fourth steps is as follows:

```
i=0; /* write offset */
j=0; /* read offset */
while (i<I) {
   for (a=0; a<N1; a++) {
      if ((j+O[a]) !=i) {
         read block[j+O[a]]
         write block [T[a]]
/* The array T identifies the N1 temporary block locations
*/
      }
   }
   for (a=0; a<N1; a++) {
      read block[T[a]]
      write block[i];
      i++.
   }
   j+=N2;
}
while (i<B) {
   for (a=0; a<N1; a++) {
      read block[j+O[a]];
      write block[i];
      i++;
   }
   j+=N2;
}
```

The first while loop operates up to the pivot point, and performs step 83 of FIG. 8. In its first for loop, blocks of data are copied from the initial disk drives to the temporary storage, and in its second for loop, the blocks of data are copied from the temporary storage to the disk drives in the new configuration. The first loop will be called the pivot-loop. The second while loop sequentially copies data blocks from the initial disk drives to the disk drives in the new configuration. This second while loop will be called the copy-loop. The copy loop performs step 84 of FIG. 8. In the "C" language, the statement "j+=N2" sets the value of j to the sum of j and N2.

Figure 9:
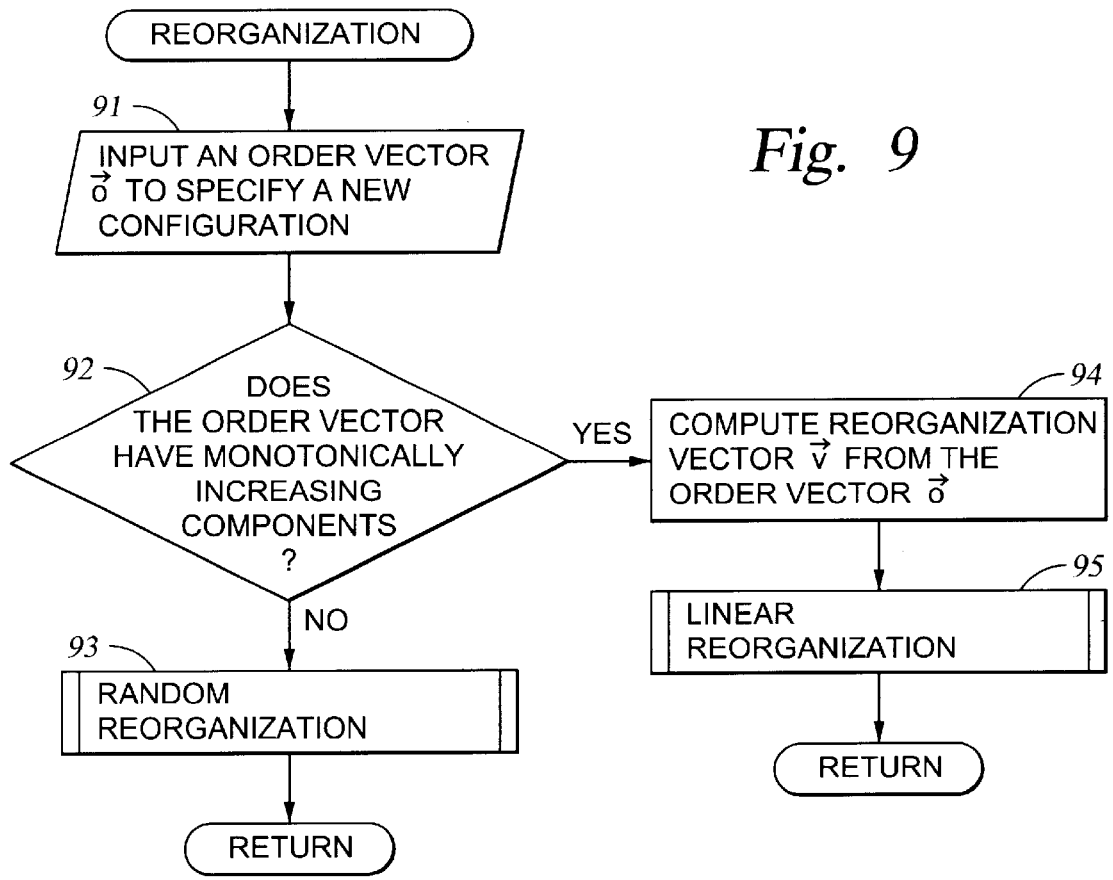
FIG. 9 is a flowchart of a procedure for performing either a linear reorganization or a random reorganization as required for a new configuration of disk drive sets.

With reference to FIG. 9, the order vector O can be used as a specification for the general case, and automatically converted to the reorganization vector V if the order vector specifies a linear reorganization. In step 91, the order vector O is received as an input specification for the desired reorganization. In step 92, the order vector is inspected to determine whether its components are monotonically increasing. If not, then execution continues to step 93 to perform a random reorganization as described above with reference to FIG. 8. If so, then the reorganization is linear, and execution branches from step 92 to step 94. In step 94, the reorganization vector V is computed in step 94 from the order vector 0. Then in step 95, a linear reorganization is performed using the reorganization vector V. An example of a program for performing the reorganization of FIG. 9 is as follows:

```
for (i=0; i<N1; i++) {
   input(O[i])
}
for (i=0; i<N1-2; i++) {
   if O[i]>O[i+1]{
      random(O);
      return;
   }
}
V=0;
K=0×1;
for (i=0; i<N2; i++) {
   for (j=0; j<N1; j++ {
      if (i=O(j) {
         V[i]=V[i] | K;
         break;
      }
   }
   K<<;
}
linear (V);
return;
```

The linear and random expansion procedures described above can be implemented easily on a single host computer. In the video file server of FIG. 2, for example, any one of the controller servers 28, 29 or stream server computers 21 could be programmed to function as a host computer to perform the expansion. However, if multiple hosts such as the stream server computers 21 need to access the cached disk array during the reorganization process, the procedures are rather inefficient. This is because all hosts must be synchronized after each block is copied to ensure that each host retains the correct block ordering.

Figure 10:
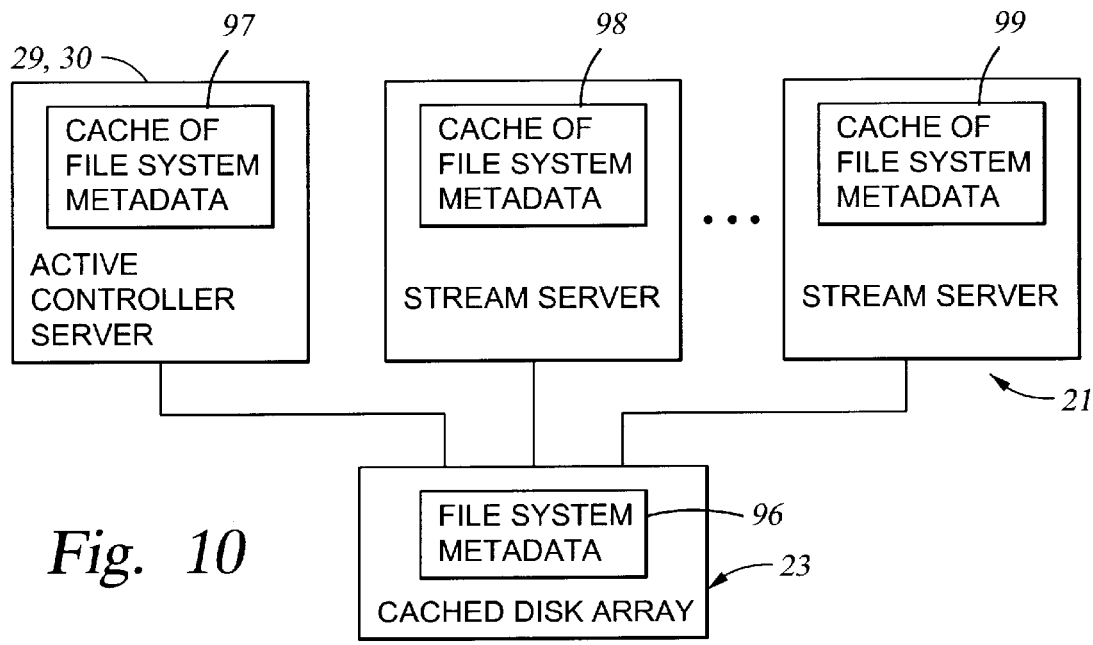
FIG. 10 is a block diagram showing a distribution of file system metadata in the video file server of FIG. 1.

Synchronization is expensive and consumes system resources and slows down the expansion process. In the video file server of FIGS. 1 and 2, synchronization involves invalidating local caches of file system metadata. With reference to FIG. 10, for example, the "master" copy of the file system metadata 96 is kept in the cached disk array 23. The active controller server 29, 30 has a local cache of the file system metadata 97, and each of the stream servers 21 also has a respective local cache of the file system metadata 98, 99. For the active controller server to synchronize the metatdata, it writes its copy 97 back to the master copy 96, and then sends a synchronization command to each of the stream servers 98, 99. Each stream server responds by invalidating its local cache 98, 99 and returning an acknowledgement. Moreover, for a stream server to later access to the file system, it must download the new file system metatdata 96 to its local cache 89, 99. Further details regarding the use of a local cache of file system metadata in the stream servers are found in Vahalia et al. U.S. Pat. No. 5,893,140 issued Apr. 6, 1999.

In accordance with another aspect of the invention, there is provided a reorganization method that reduces the synchronization overheads and scales efficiently across both linear and random expansion. We are primarily interested in minimizing the frequency of synchronization. This is achieved by providing synchronization points during reorganization when units of the reorganization are changed. This results in a net reduction in the number of synchronization events from a function $O(B)$ to $O(\log(B))$, which provides a significant performance gain.

For example, in FIGS. 5 and 6, a stripe-layer between the original and new file systems that can be written over without losing the original information is created after the first fourteen blocks of data have been copied. From this point onwards, for shared data that has a "read-only" attribute for multiple hosts, the frequency of synchronization can be reduced to intervals of a slice-copy, because the same data can be read using either the "old" metadata or the "new" metadata. The only difference between the "old" metadata and the "new" metadata will be different locations for N1 blocks of original data that reside uncorrupted at both of the different locations. Initially, the synchronization interval is reduced by a factor of N2. This observation is recursively applied as the separation between the read and write pointers increase by additional factors of N2.

It may also be desirable to align the synchronization points on stripe boundaries for ease of management. This may be desirable if a file system using large fixed size extents uses the stripe. To illustrate, let E represent the extent size, in number of blocks.

If E>=N2, the alignment pivot points for various conditions are given by:

j=E*N1*N2 : E % N2 !=0 : N2 % N1=0
  E*N2 : E % N2 !=0 : N2 % N1=0
  E*N1 : E % N2=0 : N2 % N1 !=0
    E : E % N2=0 : N2 % N1=0

If E<=N2, the alignment pivot points for various conditions are given by:

j=E*N1*N2 : N2 % E !=0 : N2 % N1 !=0
  E*N2 : N2 % E !=0 : N2 % N1=0
  N1*N2 : N2 % E=0 : N2 % N1 !=0
    N2 : N2 % E=0 : N2 % N1=0

(Recall that in the C programming language, the operator "%" designates the remainder of an integer division; for example, "N1 % N2" designates the remainder of N1/N2.)

Synchronization can now be applied at the alignment points at constantly increasing separations to speed up the expansion process. Additionally, once a sufficient number of "holes" are free, expansion can be initiated on multiple hosts, further speeding up the expansion process.

Figure 11:
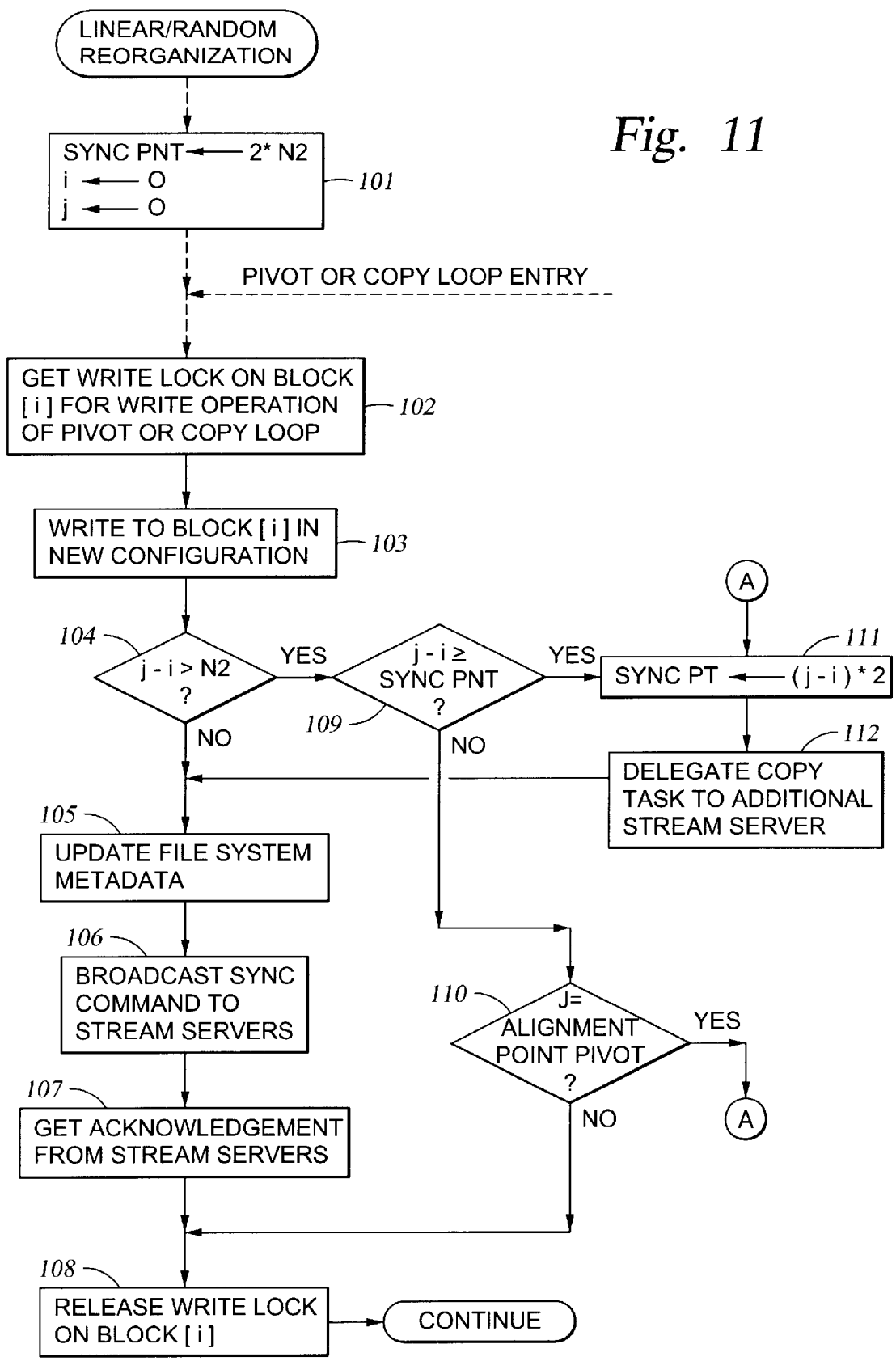
FIG. 11 is a flowchart showing how the frequency of synchronization events for multiple hosts can be minimized during a linear or random reorganization.

A specific example is shown in FIG. 11. For example, the active controller server in the video file server of FIGS. 1 and 2 performs this procedure. In a first step 101 of FIG. 11, the read and write pointers are initialized, and also a synchronization point value is initialized to 2*N2. Each pivot loop or copy loop has a number of steps 102 to 104 associated with the writing of a block of original data to a new storage location in the new linear or random configuration. In step 102 a write lock is placed on the storage to which the block will be written. Then, in step 103 the block is written to the storage location in the new configuration. Next, in step 104 the offset between the read pointer and the write pointer is compared to N2. If the offset is less than N2, then a synchronization must be performed for the block transfer. This is done in steps 105 to step 107. In step 105, the file system metadata is updated in the cached disk array. Then in step 106, a sync command is broadcast to each of the stream servers. In step 107, the controller server waits for an acknowledgement from each of the stream servers that they have synchronized their local metadata caches with the metadata that was undated in step 105. Thereafter, in step 108, the controller server releases its write lock upon the new storage location to which the block has been written, and execution in the pivot or copy loop can continue.

If in step 104 it is found that the read/write offset is greater than N2, there are N1 blocks of original data that could be read from either their new locations or their old locations. For shared read-only access, it will not be necessary to resynchronize the stream servers until the read-write offset reaches the sync point value of 2*N2. Therefore, execution branches from step 104 to step 109 to check whether the read-write offset has reached the sync point value. If not, execution can continue from step 109 to step 108. Step 110 is optional, for use if it is desired to align the read pointer at the time of synchronization to stripe or extent boundaries. In step 110, when the alignment pivot point is reached, synchronization is made to occur at a time earlier than would be absolutely necessary. In this case, and also when the synchronization point is reached in step 109, execution branches to step 111. In step 111, the next synchronization point is computed as twice the current read-write offset. This will cause the number of blocks that are read and written between the synchronization points to increase exponentially. Then in an optional step 112, the active controller server could delegate the copy task to an additional stream server. Finally, execution continues in step 105 to perform the synchronization steps 105 to 107.

For the video file server of FIG. 1, it is desirable to define two file system extension categories: (i) capacity extension; and (ii) capacity/performance extension.

Basic capacity expansion is possible when there is a need to add extra storage capacity without increasing the number of concurrent sessions supported. Reorganization of content is not necessary. If the new configuration does not meet the desired performance requirements, a capacity/performance expansion is performed using the linear or random reorganization techniques described above.

Figure 12:
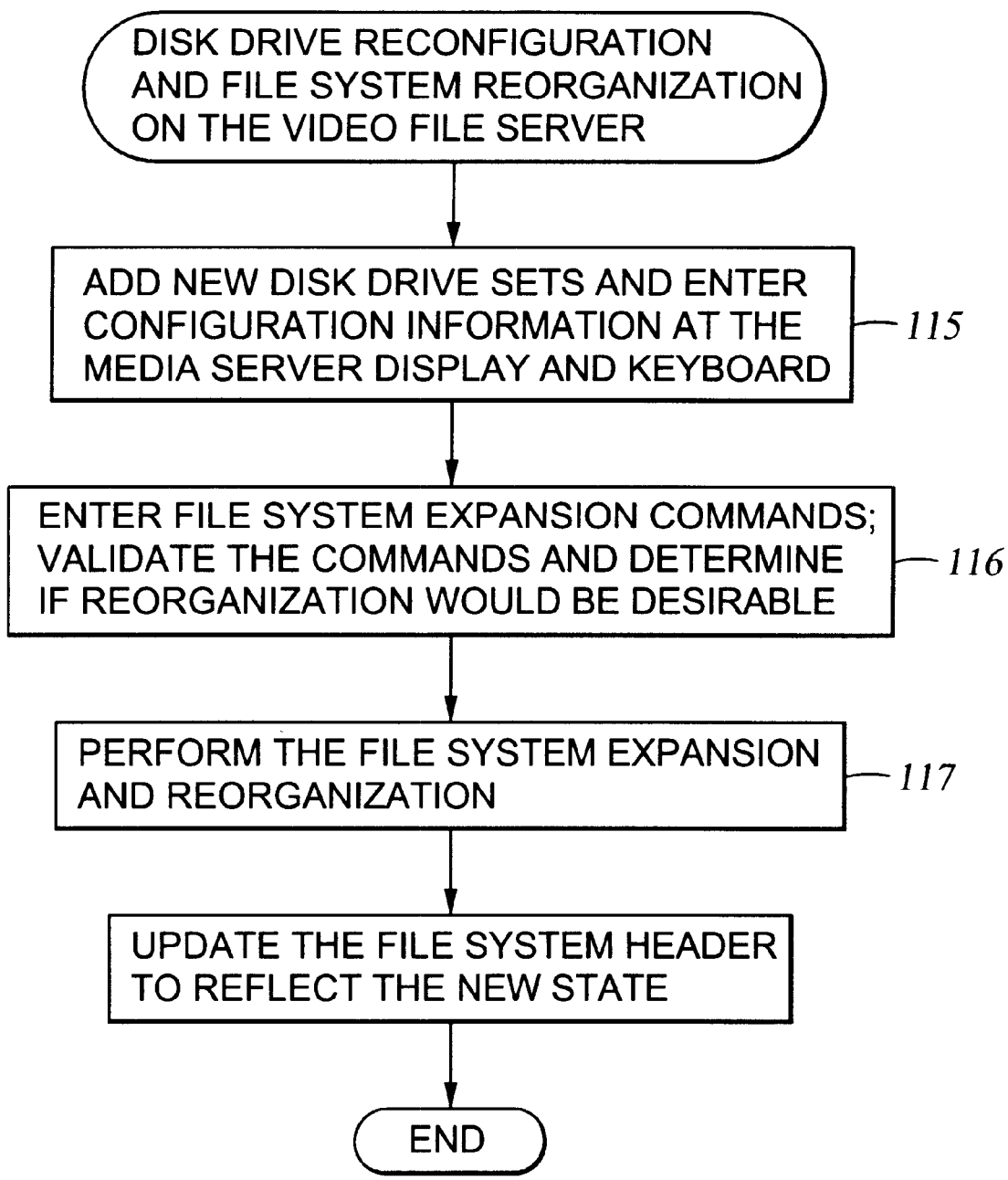
FIG. 12 is a flowchart of the basic process performed by an active controller server in the video file server of FIG. 1 during installation of additional disk drives.
Figure 13:
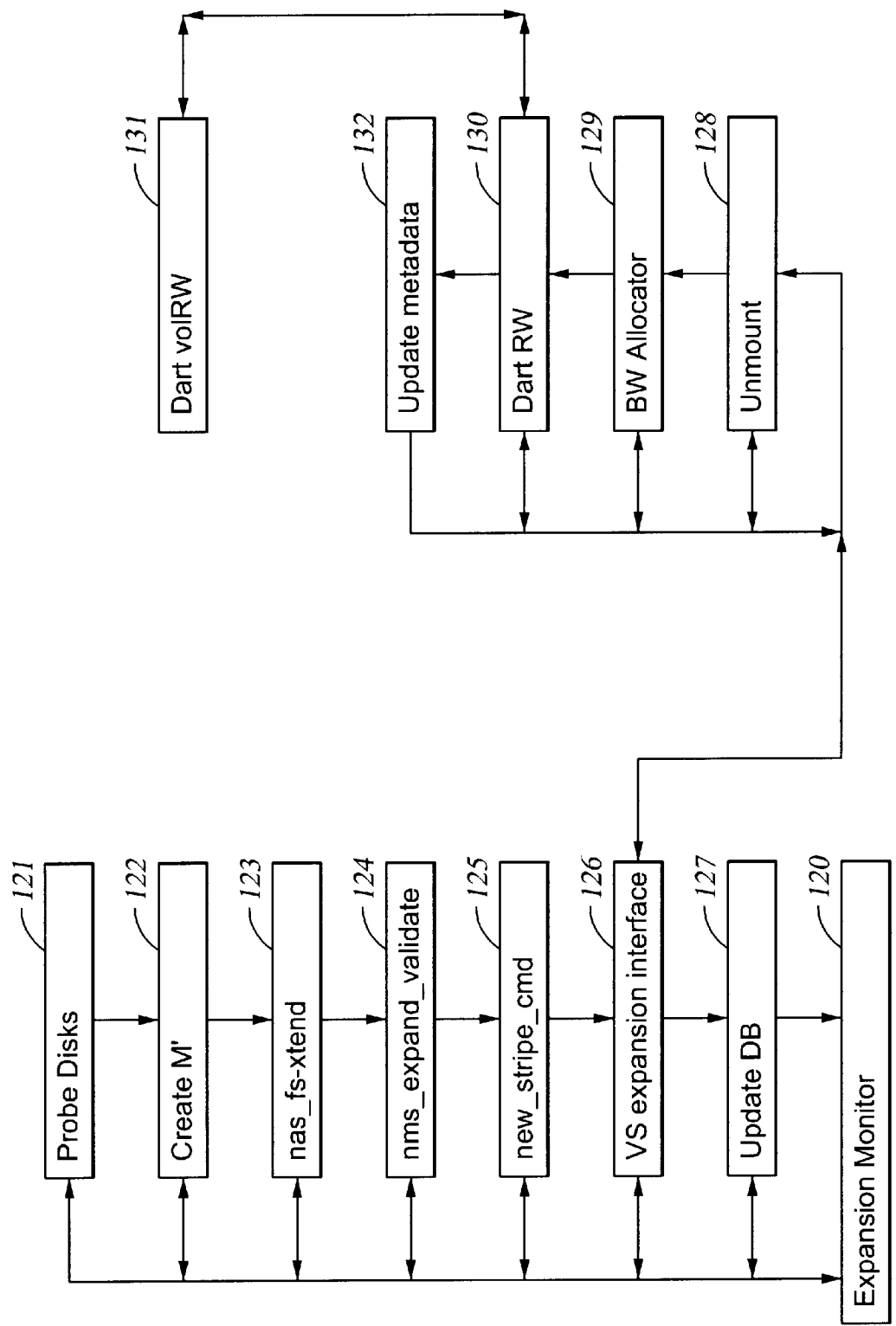
FIG. 13 is a flowchart showing a sequence of states of a controller server in the video file server of FIG. 1 when performing a reconfiguration and a linear or random reorganization of data storage.

In a specific implementation, the capacity/performance expansion for the video file server of FIG. 1 is a four phase process, as illustrated in FIG. 12. During this process, the active controller server executes a control program for on-line file system expansion. This control program can be loaded into the active controller server from a conventional program storage device such as a floppy magnetic disk. During execution of this control program, the active controller server has a sequence of states as shown in FIG. 13.

During the first phase 115, additional disk drive sets are added to the cached disk array (23 in FIGS. 1 and 2), and a process is initiated to make the additional disk drive sets visible to the stream servers (21 in FIGS. 1 and 2). This involves selecting the SCSI Target/Lun ID's for the new disk drives, selecting proper placement locations for the new disk drives, establishing logical-to-physical mappings for the new disk drives, and invoking software routines that create new files (ipl.bin files) containing attributes of the new disk drives, add the volume table of contents to the new disk drives, and that bring the new disk drives on-line. The systems administrator (not shown) invokes the software routines by entering configuration commands at the media server display and keyboard (32 in FIGS. 1 and 2). The new disk drives can be added when the cached disk array is on-line, although performance may be degraded due to sharing of access to the disk drives containing the data blocks that must be copied for the file system reorganization.

During the second phase 116, the physical installation of the new disk drives is made known to the stream servers. The systems administrator does this by entering probe commands at the media server display and keyboard. The active one of the controller servers (28, 29 in FIGS. 1 and 2) interprets the probe commands and issues them to the stream servers. (Server controller state "Probe Disks" 121 in FIG. 13.) This causes the stream servers to upload the attributes of the new disk drives from the new files (ipl.bin files) in the cached disk array to their respective local caches. Then the systems administrator enters a command at the media server display and keyboard to create a new metavolume (M') with the new disk drives to be added to the file system. (Server controller state "Create M'" in FIG. 13.) Then the systems administrator enters a file system expansion command at the media server display and keyboard to specify a file system to be expanded on the new metavolume. For example, the command has the format:

nas_fs -xtend fsname M' where "fsname" is the name of the file system to be expanded. (Server controller state "nas_fs-xtend" 123 in FIG. 13.) Next, a hardware performance model is applied to the new file system to determine if content reorganization is necessary or sufficient to meet the new performance requirements. This also validates the new file system structure. For example, the hardware performance model is invoked by the command:

nms_expand_validate fsname M' which returns

[Flag] : [Invalid | Reorg | Hyper]
[DiskList] : [(da, db, dc, . . . ]

where da, db, dc, . . . is the new stripe or hypervolume disk order. The flag determines the expansion mechanism invoked. (Server controller state "nms_expand_validate" 124 in FIG. 13.) If the expansion is deemed valid (Flag is Reorg or Hyper), then the active controller server exports the new volume structure to all of the stream servers by issuing a new stripe command to the stream servers. (Server controller state "new_stripe_cmd" 125 in FIG. 13.) This is followed by a remote procedure (RPC) call to a video service routine with the name of the file system being expanded and the new disk list. (Server controller state "VS expansion interface" 126 in FIG. 13.) The third phase 117 is the video service phase. The video service routine is performed by the active controller server. The active controller server marks the file system, unmounts the file system on all the stream servers currently using it (Unmount state 128 in FIG. 13), and invokes an expansion process (BW Allocator 129 in FIG. 13). Following this, one of the following sequences is performed. If the expansion flag is Hyper, only the file system data structures are modified to permit use of the additional disk drive storage space. If the expansion flag is Reorg, then either the linear or random reorganization procedure is executed, as described above. The active controller server initiates and monitors the expansion process using "mac" commands, as further described below. (Dart RW and Dart volRW states 130 and 131 in FIG. 13.) Following this expansion process, the server controller issues a command to the stream servers to cause them to update their local caches of file system metadata. (Update metadata 132 in FIG. 13.)

The fourth phase is the post-expansion phase. Once expansion is complete, the active controller server updates the file system headers to reflect the new state by issuing the command:

nms-fsck fsname to the cached disk array. (Server controller state "Update DB" 127 in FIG. 13.) A success flag is returned to the active controller server, which then updates its own databases. The active controller server subsequently issues a command to each of the stream servers to cause each stream server to remount the extended file system.

Two "mac" commands are available for implementing the expansion. The active controller server issues the first command:

MACPROC_volRW to a stream server to initiate a read-write process. This read-write process could be a subset of a linear reorganization or a random reorganization. In either case, the active controller server need only specify an order of reads that are delegated to the stream server.
/* Defines for MACPROC_volRW */ struct MACARGS_volRW {
   string oldvolname<MAX_VOLNAME_LEN>;
   u_long readSector;
   string newvolname<MAX_VOLNAME_LEN>;
   u_long writeSector;
   u_10 ng count;
};

union MACRPLY_volRW switch (MACstatus status) {
   case MACERR_COMMAND :
     MACRESFAILURE error;
   default:
     void;
};

The second command is:

MACPROC_volChkSum

The active controller server can issue this command to a stream server to run a checksum generator on a volume with a count parameter to validate the correctness of data.

/* Defines for MACPROC_volChkSum */

```
struct MACARGS_volChkSum {
  string volname<MAX_VOLNAME_LEN>;
  u_long count
  u_char direction
  u_long seed
};

union MACRPLY_volChkSum switch (MACstatus status)
{
case MACERR_COMMAND:
  MACRESFAILURE error;
case MAC_OK:
  u_10 ng checksum;
default:
  void;
};
```

The reorganization process is initiated from the video service routine, which has complete knowledge of the system and can manage the expansion.

Validation of the expansion process can be performed by generating a well-defined data pattern, storing it, and validating its correctness after expansion. For example, the command:

nrns-mkfile fsname [-name] [-used] [-seed<>] [-random | -movie | -linear]

is used to write data on the original file system in a controlled manner, using predefined access patterns. p The command:

nms_chkfile fsname [-name] [-used] [-seed<>] [-random I -movie I -linear]

is used to read data from any file system containing data generated from nms-mkfile and validate its correctness. Both nms-mkfile and nms_chkfile can use a common procedure and interfaces of MACPROC_volChkSum for computing the checksum during reading and writing of the test files.

The validation of the expansion can be done in one of several ways. For example, a linear validation test could be performed where the entire content of the server is validated. Alternatively, a random test could be performed that validates a random set of blocks to ensure "goodness" with a certain probability. Field testing could include testing of the synchronization of the multiple stream servers during reorganization. For example, the video service can allocate a small number of extents that are marked ahead of time as validation points and the synchronization of the stream servers at these validation points could be verified by capturing and comparing the file system metadata existing in the local caches of the stream servers at these validation points.

In view of the above, there has been described a process of expanding striped file systems in which the required temporary storage has been reduced. This process has been extended to manage expansion efficiently when the file system is mounted on multiple hosts. A specific implementation has been described for a video file server having a cached disk storage subsystem and multiple stream server computers for servicing clients in a data network. The expansion can be performed on-line while the file server concurrently services client requests for data that is being reorganized.

What is claimed is:

1. A method of operating a data storage system for on-line expansion of a file system so that the file system uses additional data storage added to original data storage of the data storage system, data of the file system residing in the original data storage prior to the expansion, said method comprising the steps of reorganizing at least a portion of the data of the file system by moving some of the data of the file system from the original data storage to the additional data storage so tat the data of the file system is distributed over the original data storage and the additional data storage, and a file of the file system is reorganized by distributing data of the file over the original data storage and the additional data storage so that one portion of the data of the file remains in the original data storage and another portion of the data of the file is moved from we original data storage to the additional data storage, and repetitively updating metadata of the file during the movement of data of the file to permit a host processor to access concurrently the data of the file during the reorganization of the file;

wherein data of the file is sequentially striped across the original data storage prior to the expansion, and during the expansion data of the file is sequentially striped across the original data storage and the additional data storage; and wherein an order of striping of data of the file in the original data storage prior to the expansion is not preserved during the striping of data across the original data storage and the additional data storage during the expansion, and the movement of data of the file from the original data storage to the additional data storage is performed up to a pivot point by using temporary storage for the data that is moved, and after the pivot point the movement of data of the file from the original data storage to the additional data storage is performed without using temporary storage for the data that is moved.

2. The method as claimed in claim 1, which includes the data storage system sending a synchronization command to the host processor after each repetitive updating of the metadata of the file system.

3. The method as claimed in claim 1, wherein an exponentially increasing amount of data of the file system is moved from the original data storage to the additional data storage between the repetitive updating of the metadata of the file system.

4. The method as claimed in claim 1, wherein the data storage system performs the movement of data of the file system in response to data access commands from an increasing number of host processors between the repetitive updates of the metadata of the file system.

5. The method as claimed in claim 1, wherein the striping of data across the original data storage and the additional data storage permits simultaneous access to the original data storage and the additional data storage during access to the file.

6. The method as claimed in claim 5, wherein the original data storage and the additional data storage are provided by disk drives in the data storage system, and the striping of data across the original data storage and the additional data storage permits simultaneous access to a greater number of the disk drives during access to the file after the reorganization of the file system than before the reorganization of the file system.

7. The method as claimed in claim 1, wherein the original data storage and the additional data storage are provided by disk drives in the data storage system, the host processor accesses data in the disk drives by specifying logical track addresses to the data storage system, and the striping of data of the file during the reorganization process preserves a linear relationship between the logical track addresses and physical track addresses of data of the file in the disk drives.

8. The method as claimed in claim 1, wherein the data storage system is a cached disk array in a file server, the file server also includes a plurality of stream server processors, the stream server processors function as host processors by servicing client requests for file data being reorganized, and the stream servers service the client requests concurrently with the reorganization of the file data.

9. The method as claimed in claim 8, wherein the file server further includes a controller server, and the method includes the controller server controlling the expansion and reorganization of the file system.

10. A data storage system comprising:
original data storage containing a file system; and
a data processor for accessing the file system in the data storage, the data processor being programmed for on-line expansion of the file system so that the file system may use additional data storage added to the original data storage, the data processor being programmed to perform the on-line expansion by moving some of the data of the file system from the original data storage to the additional data storage so that the data of the file system is distributed over the original data storage and the additional data storage, and a file of the file system is reorganized by distributing data of the file over the original data storage and the additional data storage so that one portion of the data of the file remains in the original data storage and another portion of the data of the file is moved from the original data storage to the additional data storage, and repetitively updating metadata of the file during the movement of data of the file to permit a host processor to access concurrently the data of the file during the reorganization of the file;
wherein data of the file is sequentially striped across the original data storage and the additional data storage; and
wherein the data processor is programmed to move data of the file from the original data storage to the additional data storage up to a pivot point by using temporary storage for the data that is moved, and after the pivot point to move the data of the file from the original data storage to the additional data storage without using temporary storage for the data that is moved.

11. The data storage system as claimed in claim 10, wherein the data processor is programmed for sending a synchronization command to the host processor after each repetitive updating of the metadata of the file system.

12. The data storage system as claimed in claim 10, wherein the data processor is programmed for moving an exponentially increasing amount of data of the file system from the original data storage to the additional data storage between the repetitive updating of the metadata of the file system.

13. The data storage system as claimed in claim 10, wherein the data processor is programmed to delegate the process of moving data of the file system to an increasing number of host processors between the repetitive updates of the metadata of the file system.

14. The data storage system as claimed in claim 10, wherein the striping of data across the original data storage and the additional data storage permits simultaneous access to the original data storage and the additional data storage during access to the file.

15. The data storage system as claimed in claim 14, wherein the original data storage and the additional data storage are provided by disk drives in the data storage system, and the striping of data across the original data storage and the additional data storage permits simultaneous access to a greater number of the disk drives during access to the file after the reorganization of the file system than before the reorganization of the file system.

16. The data storage system as claimed in claim 10, wherein the original data storage and the additional data storage are provided by disk drives in the data storage system, the host processor accesses data in the disk drives by specifying logical track addresses to the data storage system, and the striping of data of the file system during reorganization preserves a linear relationship between the logical track addresses and physical track addresses of data of the file system in the disk drives.

17. The data storage system as claimed in claim 10, wherein the data storage is a cached disk array in a file server, the file server also includes a plurality of stream server processors, the stream server processors are programmed to function as host processors by servicing client requests for file data being reorganized, and the stream servers are programmed to service the client requests concurrently with the reorganization of the file data.

18. The data storage system as claimed in claim 17, wherein the data processor is a controller server for the file server.

19. A program storage device containing a program for a data processor of a data storage system, the program being executable by the data processor for on-line expansion of a file system so that the file system may use additional data storage added to original data storage, the program being executable by the data processor to perform the on-line expansion by moving some of the data of the file system from the original data storage to the additional data storage so that the data of the file system is distributed over the original data storage and the additional data storage, and a file of the file system is reorganized by distributing data of the file over the original data storage and the additional data storage so that one portion of the data of the file remains in the original data storage and another portion of the data of the file is moved from the original data storage to the additional data storage, and repetitively updating metadata of the file during the movement of data of the file to permit a host processor to access concurrently the data of the file during the reorganization of the file;
wherein data of the file is sequentially striped across the original data storage and the additional data storage, and the data processor is programmed to move data of the file from the original data storage to the additional data storage up to a pivot point by using temporary storage for the data that is moved, and after the pivot point to move the data of the file from the original data storage to the additional data storage without using temporary storage for the data that is moved.

20. The program storage device as claimed in claim 19, wherein the program is executable by the data processor for sending a synchronization command to the host processor after each repetitive updating of the metadata of the file system.

21. The program storage device as claimed in claim 19, wherein the program is executable by the data processor for moving an exponentially increasing amount of data of the file system from the original data storage to the additional data storage between the repetitive updating of the metadata of the file system.

22. The program storage device as claimed in claim 19, wherein the program is executable by the data processor for delegating the process of moving data of the file system to an increasing number of host processors between the repetitive updates of the metadata of the file system.

* * * * *